United States Patent [19]
Fujimaki

[11] Patent Number: 5,854,666
[45] Date of Patent: Dec. 29, 1998

[54] LIQUID CRYSTAL DISPLAY DEVICE HAVING PARTICULAR TWIST ANGLE, $\Delta_N D$, $\Delta\epsilon$, AND THRESHOLD VOLTAGE

[75] Inventor: Eriko Fujimaki, Tokyo, Japan

[73] Assignee: NEC Corporation, Tokyo, Japan

[21] Appl. No.: 979,265

[22] Filed: Nov. 26, 1997

[30] Foreign Application Priority Data

Nov. 28, 1996 [JP] Japan ..................... 8-317598

[51] Int. Cl.⁶ ............... C09K 19/02; G02F 1/1335
[52] U.S. Cl. ............... 349/180; 349/181; 349/96
[58] Field of Search ................... 349/180, 181, 349/96

[56] References Cited

U.S. PATENT DOCUMENTS

| | | | |
|---|---|---|---|
| 5,058,998 | 10/1991 | Yoshida et al. | 349/180 |
| 5,124,825 | 6/1992 | Asano et al. | 349/181 |
| 5,387,369 | 2/1995 | Weber et al. | 349/179 |
| 5,520,846 | 5/1996 | Plach et al. | 349/182 |
| 5,598,285 | 1/1997 | Kondo et al. | 349/141 |
| 5,696,570 | 12/1997 | Plach et al. | 349/180 |

FOREIGN PATENT DOCUMENTS

| | | |
|---|---|---|
| 4-338732 | 11/1992 | Japan . |
| 7-34066 | 2/1995 | Japan . |

Primary Examiner—William L. Sikes
Assistant Examiner—Tiep H. Nguyen
Attorney, Agent, or Firm—Sughrue, Mion, Zinn, Macpeak & Seas, PLLC

[57] ABSTRACT

A TN-mode, normally-white format liquid crystal display device having high contrast and exceptional display characteristics. The angle of gradation inversion is increased and a straight-on contrast of more than 100 is obtained by setting the twist angle to 78°–90°, preferably 84°–90°, $\Delta_n d$ to 0.3–0.4 $\mu$m, preferably 0.35–0.38 $\mu$m, and $\Delta_\epsilon$ to at least 6.2.

6 Claims, 7 Drawing Sheets

LIQUID CRYSTAL DISPLAY DEVICE HAVING PARTICULAR TWIST ANGLE, $\Delta_N D$, $\Delta\epsilon$, AND THRESHOLD VOLTAGE

BACKGROUND OF THE INVENTION

1. Field of the Invention

The present invention relates to a liquid crystal display device, and particularly relates to a TN mode, normally-white format active matrix type liquid crystal display device.

This application is based on Patent Application No. Hei 8-317598 filed in Japan, the content of which is incorporated herein by reference.

2. Background Art

Conventionally, TN mode (twisted nematic mode) normally-white format active matrix type liquid crystal display devices are usually constructed by forming a liquid crystal layer in a space between a front panel having switch elements and pixel electrodes, and a back panel, and positioning polarizing plates on the outsides of this front panel and the back panel. The transmission of light is changed by changing the orientations of the liquid crystal molecules according to the voltage applied across electrodes formed on the inner surfaces of the front panel and back panel.

Figure 8A:
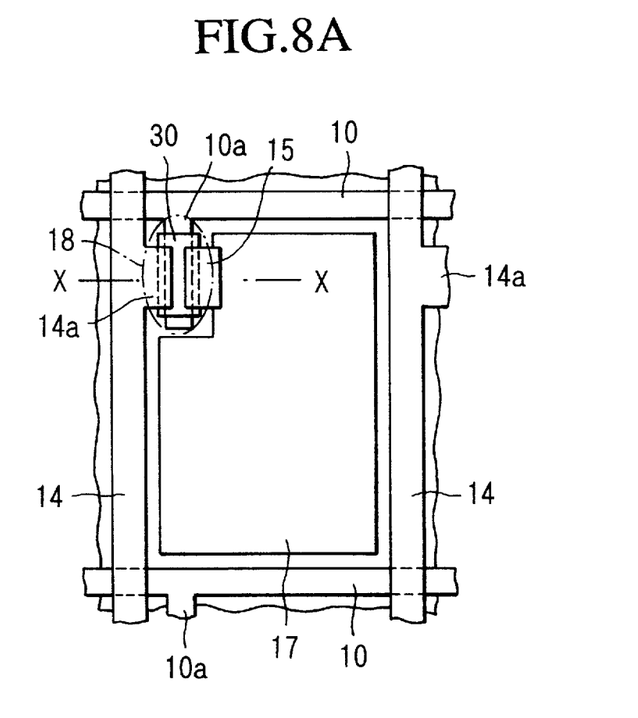
FIG. 8A is a plan view showing a single pixel in an active matrix panel of a TN mode, normally-white format liquid crystal display device.
Figure 8B:
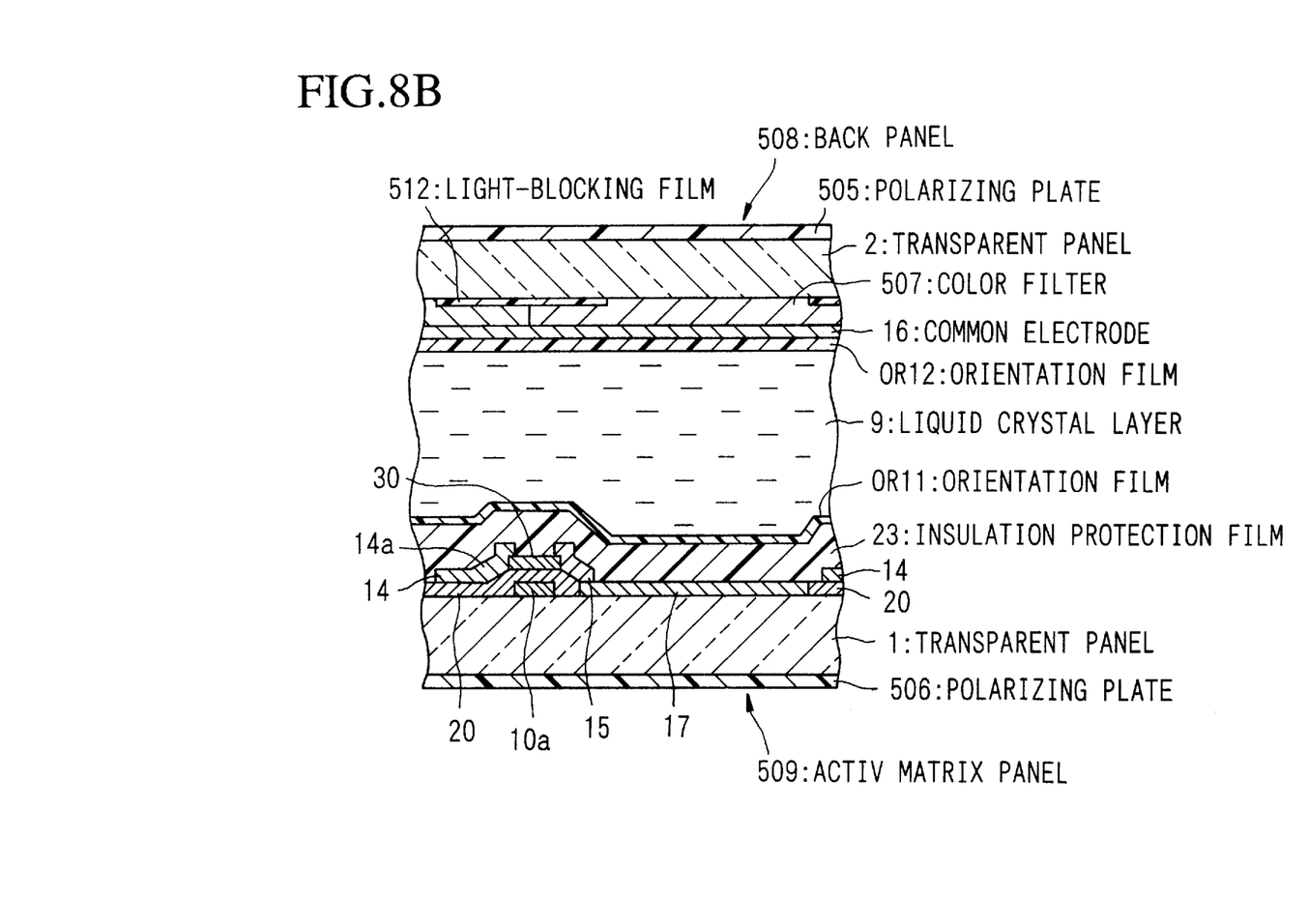
FIG. 8B is a section view cut along the line X—X in FIG. 8A.

FIG. 8A is a plan view showing the structure of a single pixel of an active matrix panel constituting this type of liquid crystal display device. FIG. 8B is a section view showing a liquid crystal display device including an enlarged cross-section along the line X—X in FIG. 8A.

A plurality of gate wires (scanning lines) 10 and drain wires (signal lines) 14 run horizontally and vertically along the inside surface of an active matrix panel 509, and a switch element 18 using a thin-film transistor is formed in the vicinity of each intersecting portion. A transparent pixel electrode 17 composed of indium tin oxide or the like is formed in each of the cells formed by the gate wires 10 and drain wires 14, thus forming pixels arranged in matrix form. Each pixel electrode 17 is connected to a source electrode 15 of a switch element 18 and connected to a drain wire 14 via a drain electrode 14*a* of a switch element 18. Thin-film transistors are often used to form these switch elements 18. Such thin-film transistors can be produced by forming a gate insulating film 20, then a semiconductor layer 20 on top of a gate electrode 10*a,* and providing a drain electrode 14*a* and a source electrode 15*a* on respective sides of the semiconductor layer 30.

Color filters 507 of the three primary colors red (R), blue (B) and green (G) are arranged in matrix-form at positions on the inside surface of the back panel 508 corresponding to the pixels of the active matrix panel. Such color filters are usually formed by pigment-dispersed polymers or dyed water-soluble polymers. In order to block light leaking between the thin-film transistors on the active matrix panel or between the color filters, light-blocking films 512 are formed between the color filters. As light-blocking films 512, chrome thin films or black-dyed synthetic resins are generally used. Additionally, a common electrode 16 composed of an ITO or the like is formed over the color filters 507 and light-blocking films 512.

Orientation films OR11 and OR12 produced by rubbing polyimide films which are formed such that their directions of orientation are roughly perpendicular are respectively formed on the inner surfaces of two transparent panels 1 and 2. When no electrical field is applied, the liquid crystal molecules are controlled such that their orientations are roughly parallel to nearby transparent panel surfaces, and the overall orientation is gradually turned through 90° from one transparent panel to the other transparent panel.

Next, the operations of such an active matrix liquid crystal display panel shall be explained. When a required electrical voltage is applied to the wire 10, the switch element 18 is turned ON, an electrical charge passes from the drain wire 14 through the semiconductor layer 30 and the source electrode 15 to the pixel electrode 17.. The liquid crystal molecules are aligned in a predetermined direction according to a vertical electrical field between the pixel electrode 17 and the common electrode 16 so as to change the rotational polarization of the transmitted light. Then, the two polarizing plates 505 and 506 act to change the transmission of light depending on the voltage applied to each pixel, thereby generating areas of lightness and darkness in order to form an image.

However, in this type of conventional liquid crystal display device, the lightness and darkness are known to change according to the angle from which the screen is viewed, because the rotational polarization of the transmitted light changes. In general, the direction of orientation of the liquid crystal is often controlled such that a high perspective view is lighter and a low perspective view is darker. In this case, an image with favorable contrast can be seen when a screen positioned vertically erect is viewed from straight on, i.e. in the direction normal to the surface of the screen. However, when the screen is viewed from a diagonally downward direction with respect to a line normal to the screen, the screen can look dark, and when view from further downward, the light areas and dark areas on the screen can become inverted to cause an inversion of gradation. On the other hand, when the screen is viewed from a diagonally upward direction with respect to a line normal to the screen, the screen can look light. This effect occurs because the orientation of the liquid crystal molecules is fixed in a display format wherein the rotational polarization of light is controlled by applying an electric field perpendicular to the panel to the liquid crystal layer so as to align the liquid crystal molecules along the direction of the electric field. This is because the direction of alignment becomes fixed when an electrical field is applied due to the direction of orientation of the liquid crystal molecules being controlled by the orientation films OR 11 and 12.

This effect is known to be able to be remedied by optimizing the $\Delta_n d$ and the twist angle of the liquid crystal. Here, $\Delta_n d$ is the product of the refractive index anisotropy $\Delta_n$ of the liquid crystal and the thickness d of the liquid crystal layer, i.e. the panel gap. The angle of view over which gradation inversion occurs has a tendency to broaden as the twist angle decreases or $\Delta_n d$ decreases, and the gradation inversion can be improved by setting the twist angle and $\Delta_n d$ to their optimum values. However, when the twist angle and $\Delta_n d$ are reduced so as to set them to the optimum range for preventing gradation inversion, the transmission rate of black tends to increase so as to lower the contrast.

Therefore, methods of using liquid crystal having specific elastic modulus and methods of reducing the chiral dopant have been proposed as methods for obtaining liquid crystal display devices which prevent gradation inversion but have high contrast.

For example, Japanese Patent Application, First Publication No. Hei 1-243019 proposes obtaining a liquid crystal display device having a wide angle of view and high contrast, by using liquid crystal wherein $\Delta_n d$ is set to 0.3–0.6, the ratio ($k_{33}/k_{11}$) between the bending modulus $k_{33}$ and the spreading modulus $k_{11}$ of the liquid crystal is 1.0 or less, and the ratio $(k_{33}/k_{22})$ between the bending modulus $k_{33}$ and the twisting modulus $k_{22}$ of the liquid crystal is 2.0 or more. This first conventional example obtains a high contrast by changing the transmission characteristics of the liquid crystal layer with respect to applied voltage by using a liquid crystal having a specified elastic modulus.

However, these types of elastic moduli cannot be achieved unless the liquid crystal materials have cyano groups or fluoro groups and have high polarity. Liquid crystal display devices using liquid crystal materials having high polarity easily collect impurities due to the high polarity of the liquid crystal, thus having a tendency to form display blotches or long-term residual images, and are therefore not suited to practical application.

Additionally, Japanese Patent Application, First Publication no. Hei 4-338732 describes improving the angle of view characteristics in liquid crystal cells without adding chiral dopants, by setting the twist angle to 70°–88° and $\Delta_n d$ to 0.30–0.38, and deflecting the polarizing plates by 0°–10° from the direction of orientation of the liquid crystal because the twist angle is decreased. Generally, chiral dopants are added to liquid crystal in order to control the twisting direction of the liquid crystal. The more chiral dopant is added, the stronger the force controlling the twisting of the liquid crystal. In this second conventional example, the twist angle is small and a chiral dopant is not added, as a result of which the twisting of the liquid crystal is easily loosened when an electrical voltage is applied, and the contrast increases.

However, in liquid cells of this type wherein chiral dopants are not added, areas wherein the liquid crystal is twisted in the direction reverse to the intended direction arise fairly easily, as a result of which disclination and display blotches can occur.

Although the first and second examples of the conventional art described above have high contrast and improve the angle of view characteristics, they also result in display blotches and reduce the reliability in the display performance, and therefore are not suited to practical application.

SUMMARY OF THE INVENTION

In view of the above problems, the present invention has the object of offering a TN mode, normally-white format liquid crystal display device having high contrast and with excellent angle of view characteristics, which can be produced without requiring any special production steps.

The present invention offers a TN mode, normally-white format liquid crystal display device, comprising a base panel having a plurality of switch elements and pixel electrodes connected thereto, arranged in matrix-form and covered by a first orientation film; a back panel having a plurality of color filters corresponding to the pixel electrodes, and covered by a second orientation film; a liquid crystal layer between the base panel and the back panel; a first polarizing plate provided on an outside of the base panel; and a second polarizing plate provided on an outside of the back panel; wherein a twist angle is at least 78° and at most 90°, a product $\Delta_n d$ between a refractive index anisotropy $\Delta_n$ and a thickness d of the liquid crystal layer is at least 0.3 μm and at most 0.4 μm, a dielectric constant anisotropy $\Delta_\epsilon$ is at least 6.2, and a threshold voltage is at most 1.2 V.

In this case, it is more preferable when the twist angle is at least 84° and at most 90°, the product $\Delta_n d$ between a refractive index anisotropy $\Delta_n$ and a thickness d of the liquid crystal layer is at least 0.35 μm and at most 0.38 μm, the dielectric constant anisotropy $\Delta_\epsilon$ is at least 6.2, and the threshold voltage is at most 1.2 V.

Additionally, it is possible to use a first orientation film and second orientation film comprising polyimide films which have been rubbed.

Furthermore, the liquid crystal display device may be such that the base panel comprises a plurality of parallel scanning lines provided on the surface of a first transparent panel, a plurality of parallel signal lines intersecting the scanning lines, a plurality of three-terminal switch elements each provided at a portion of intersection between the scanning lines and the signal lines and connected to a scanning line and a signal line, and an insulation protection film provided between the signal lines and switch elements and the first orientation film; and the back panel comprises a plurality of light-blocking films and color filters provided on a surface of a second transparent panel at selected positions corresponding to the switch elements of the base panel, and a common electrode provided between the color filters and the second orientation film.

DESCRIPTION OF PREFERRED EMBODIMENTS OF THE INVENTION

Figure 1:
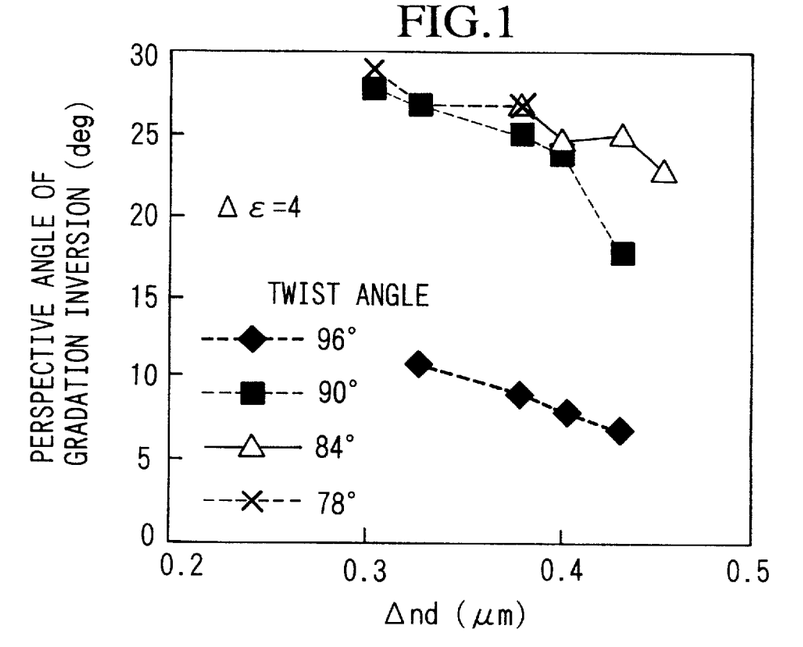
FIG. 1 is a graph showing the relationship between the low perspective gradation inversion angle and $\Delta_n d$ in a TN mode, normally-white format active matrix type liquid crystal display device.

In an active matrix type liquid crystal display device, the gradation inversion changes depending on $\Delta_n d$ and the size of the twist angle. FIG. 1 is a graph showing the angles at which the transmission rates of specific gradations are inverted from a low perspective view, that is, the range of angles at which gradation inversion does not occur. In this case, the dielectric constant anisotropy $\Delta_\epsilon$ of the liquid crystal layer is 4. The voltages at which transmission rates of 0, 10 and each additional 10% were obtained when viewing the panel from straight-on were determined, the perspective angle characteristics at these voltages were determined, and the angles at which an inversion in the transmission rate of at least 1% occurred were evaluated as being the inversion perspective angles. When holding $\Delta_n d$ constant, the range of angles over which gradation inversion does not occur broadens as the twist angle is decreased, and when holding the twist angle constant, the range of angles over which gradation inversion does not occur broadens as $\Delta_n d$ is decreased. This indicates that reducing $\Delta_n d$ and the twist angle is effective for preventing gradation inversion, and specifically that it is preferable for the twist angle to be 90° or less and $\Delta_n d$ to be 0.4 μm or less.

Figure 2:
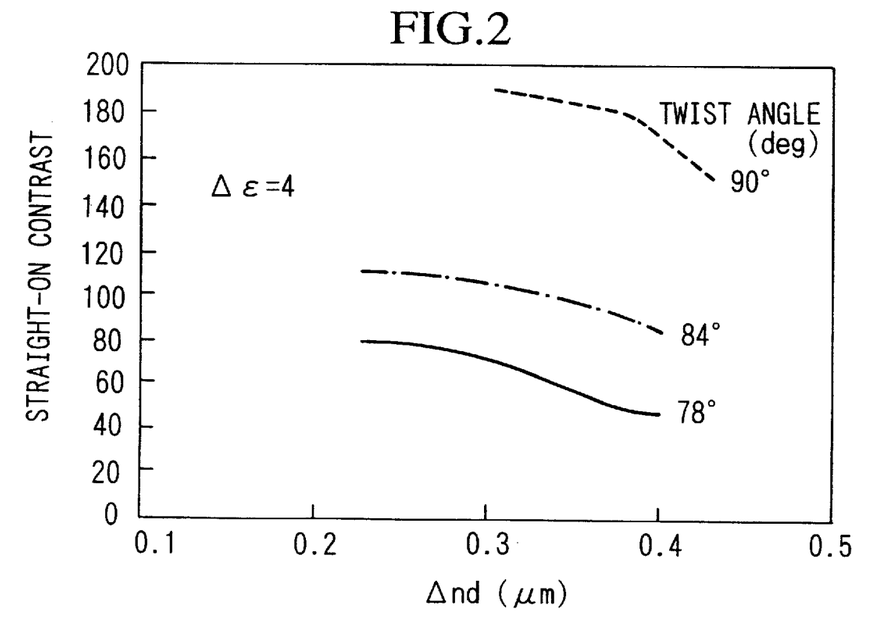
FIG. 2 is a graph showing the relationship between the straight-on contrast and $\Delta_n d$ in the same liquid crystal display device.

However, when the twist angle and $\Delta_n d$ are too small, the contrast peak shifts from the center toward a lower perspective, and the straight-on contrast is reduced. FIG. 2 is a graph showing the relationship between the straight-on contrast and $\Delta_n d$ for different twist angles. In this case, $\Delta\epsilon$ is 4. As the twist angle becomes smaller, the straight-on contrast tends to be reduced. Additionally, when holding the twist angle constant, the straight-on contrast tends to be reduced as $\Delta$ nd becomes larger. This reduction in the contrast occurs because the black brightness relatively rises. For practical purposes, a straight-on contrast of at least 100 is required, because the display characteristics may seem to be deficient if the straight-on contrast is less than 100. Accordingly, both contrast and perspective angle characteristics are acceptable when the twist angle is at least 84° and $\Delta_n d$ is 0.4 μm or less. However, these conditions merely allow for the minimum required contrast to be obtained, and are still somewhat deficient in obtaining good perspective angle characteristics.

Figure 3:
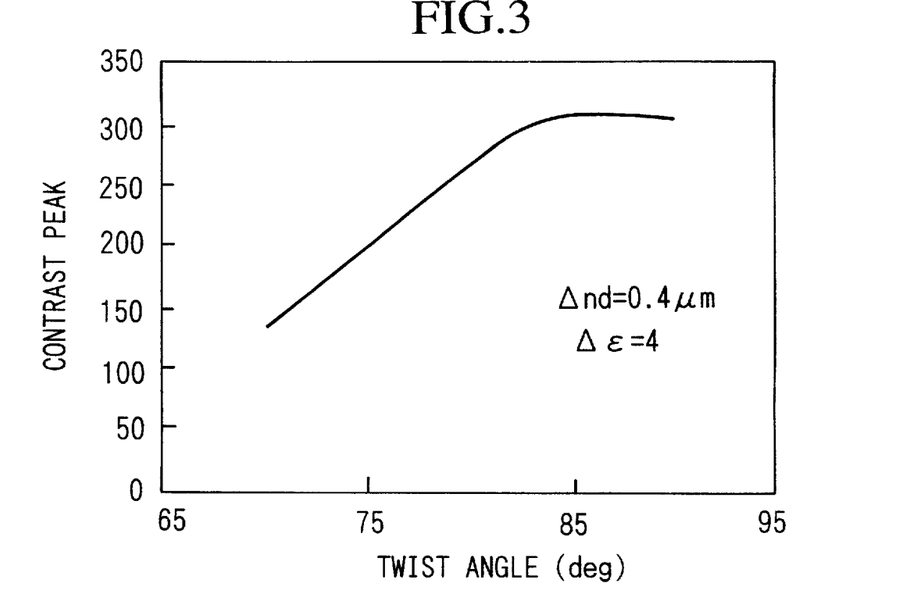
FIG. 3 is a graph showing the relationship between the straight-on contrast peak and twist angle in the same liquid crystal display device.

Additionally, when the twist angle is small, the contrast peak value is reduced and is not desirable. FIG. 3 is a graph showing the relationship between the twist angle and the contrast peak. In this case, $\Delta_\epsilon$ is 4 and $\Delta_n d$ is 0.4 μm. The contrast peak is lowered as the twist angle becomes smaller. Since a contrast peak of approximately 250 is required for practical purposes, the twist angle should preferably be at least 80°.

Figure 4:
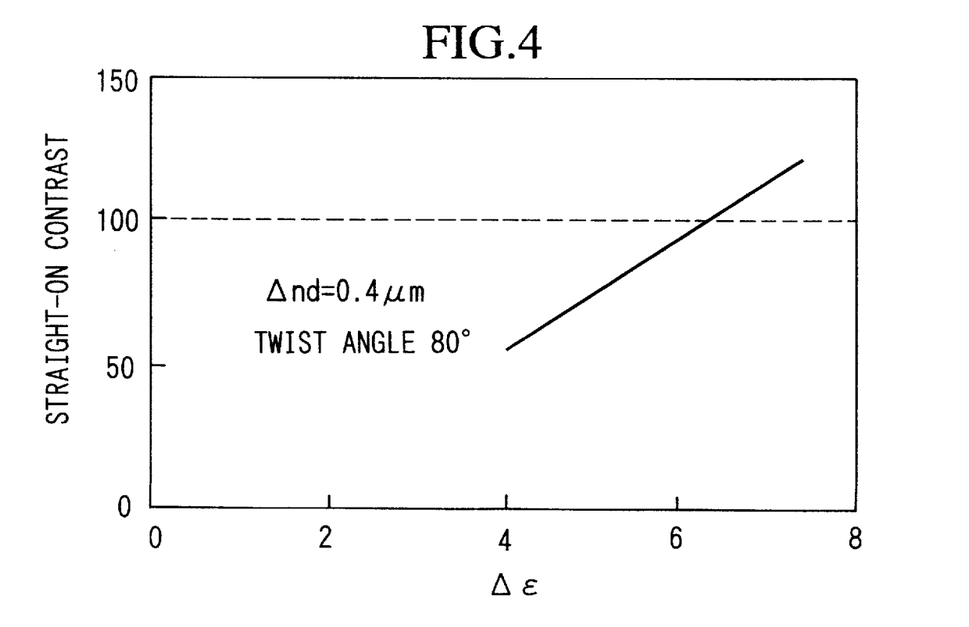
FIG. 4 is a graph showing the relationship between the straight-on contrast and $\Delta_\epsilon$ in the same liquid crystal display device.

FIG. 4 is a graph showing the relationship between the straight-on contrast and the dielectric constant anisotropy in liquid crystal in a TN liquid crystal cell wherein the twist angle is 80° and $\Delta_n d$ is 0.4 μm. As the dielectric constant anisotropy increases, the straight-on contrast rises. This is because as the dielectric constant becomes higher, the threshold voltage is lowered, making the liquid crystal molecules near the surfaces of the panels more likely to align upon application of a voltage, thereby reducing the black brightness and increasing the contrast. As a result, in liquid crystal wherein the dielectric constant anisotropy is at least 6.2, a straight-on contrast of at least 100 can be obtained when the twist angle is 80° and $\Delta_n d$ is 0.4 μm. When the twist angle is larger than 80°, the contrast is further increased, so as to result in even better display characteristics.

While the threshold voltage $V_{th}$ is the drive voltage at which the transmission rate of a liquid crystal cell becomes 90% in a normally-white format, the relationship between the threshold voltage $V_{th}$ and $\Delta\epsilon$ can be expressed by the following equations:

$$V_{th} = \frac{\pi}{2}\left(\frac{K}{\Delta_\epsilon}\right)$$

$$K = k_{11} + \frac{(k_{33} - 2k_{22})}{4}$$

The rate of transmission for black at a drive voltage exceeding the threshold voltage $V_{th}$ (black brightness) decreases as the threshold voltage $V_{th}$ decreases, thus raising the contrast. K is a physical constant characteristic of liquid crystal. FIG. 4 shows the relationship between the straight-on contrast ratio and $\Delta\epsilon$ when K is held constant. When $\Delta\epsilon$ was 6.2, $V_{th}$ was 1.2 V. Thus, a straight-on contrast of at least 100 can be achieved if $\Delta\epsilon$ is 6.2 or more and $V_{th}$ is 1.2 V or less.

Thus, while a display with reduced gradation inversion and high contrast can be obtained by making the twist angle at least 80° and at most 90°, and $\Delta_n d$ at most 0.4 μm, and using liquid crystal having a dielectric constant of 6.2 or more, if $\Delta_n d$ is made too small, reductions in the transmitted light intensity and reductions in the peak contrast can occur, which does not improve the range of the perspective view.

Figure 5:
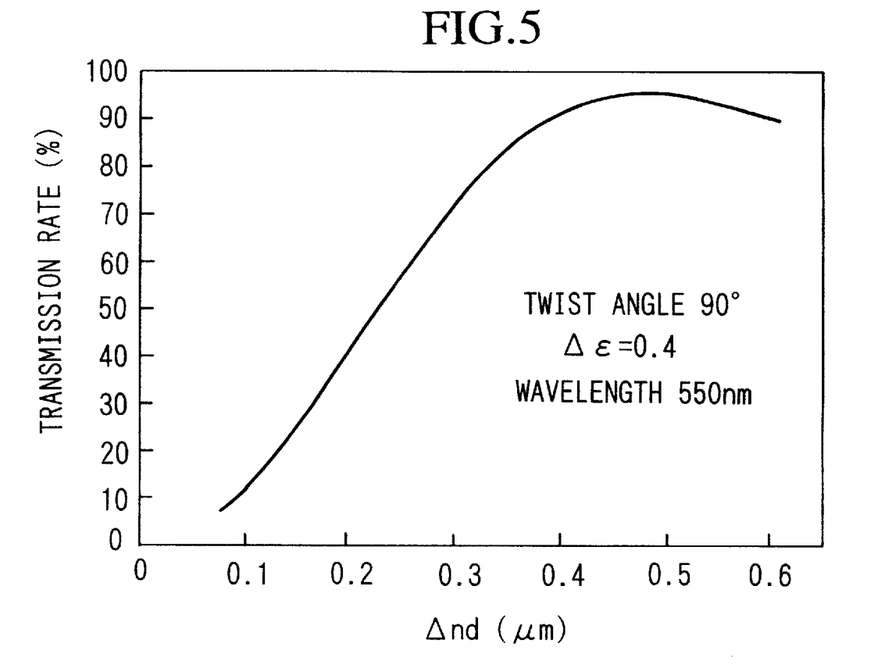
FIG. 5 is a graph showing the relationship between the transmission rate and $\Delta_n d$ in the same liquid crystal display device.

FIG. 5 is a graph showing the relationship between $\Delta_n d$ and the transmission rate, which shows that the transmission rate is reduced if $\Delta_n d$ is too small, and that specifically it should preferably be at least 0.3 μm.

Figure 6A:
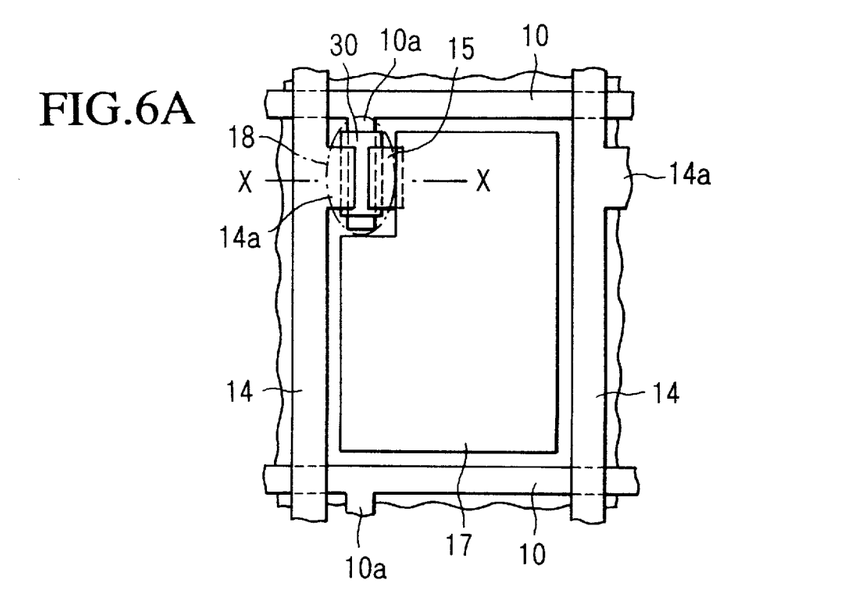
FIG. 6A is a plan view showing a single pixel in an active matrix panel using a TFT as a switch element.
Figure 6B:
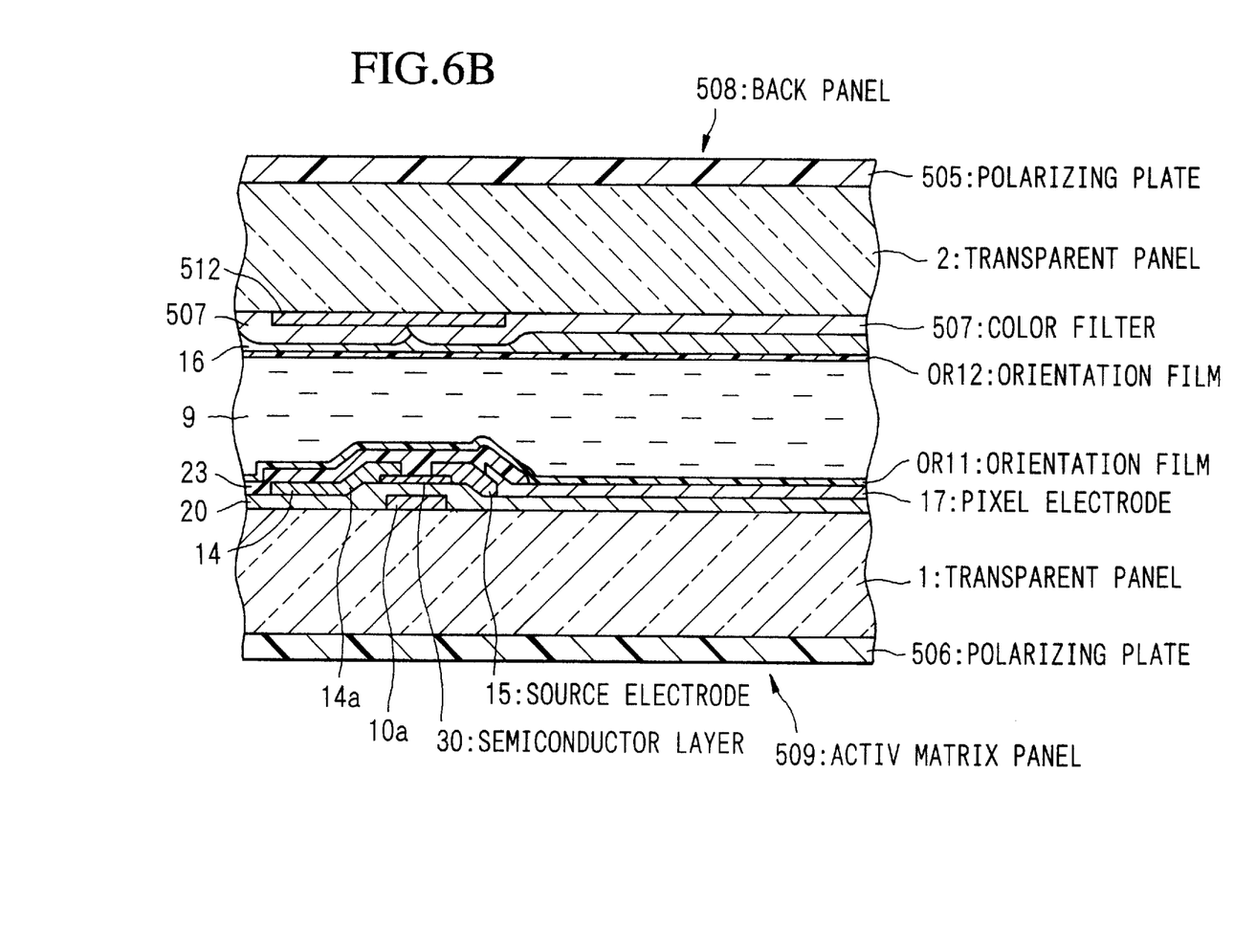
FIG. 6B is a section view cut along the line X—X in FIG. 6B.
Figure 7:
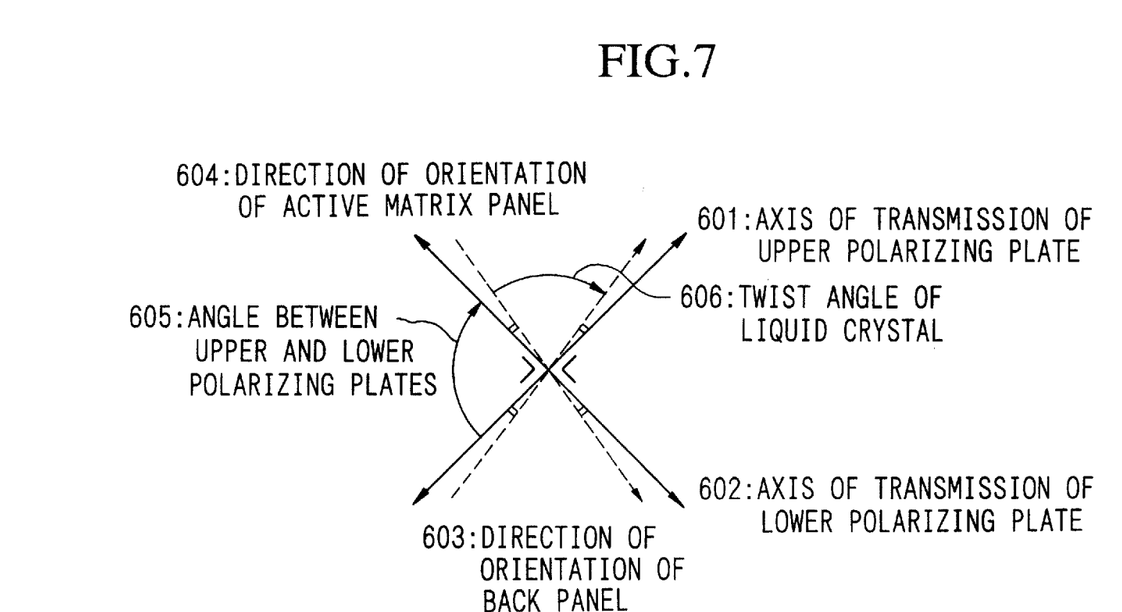
FIG. 7 is a diagram showing the relationship between the direction of orientation of the liquid crystal and the axis of polarization of light.

Hereinbelow, an embodiment of the present invention shall be described with reference to FIGS. 6A, 6B and 7. FIG. 6A is a plan view of an active matrix panel of a liquid crystal display device according to the present embodiment. FIG. 6B is a section view cut along the line X—X in FIG. 6A. FIG. 7 is a diagram showing the relationship between the direction of orientation of the liquid crystal and the axis of polarization. This liquid crystal display device comprises an active matrix panel 509, a back panel 508, a liquid crystal layer 9 injected therebetween, and polarizing plates 505 and 506 which are provided on the outsides of the panels.

The active matrix panel 509 has a plurality of parallel gate wires 10 formed on a transparent panel 1, a plurality of parallel drain wires 14 formed perpendicular to the gate wires 10, and a thin-film transistor (TFT) 18 formed in the vicinity of each intersecting portion. A transparent pixel electrode 17 is formed in each cell formed by the gate wires 10 and the drain wires 14, so as to form pixels which are arranged in matrix-form. Each pixel electrode 17 is connected to a source electrode 15 of a switch element 18, and connected to a drain wire 14 via the switch element 18. Each thin-film transistor is produced by forming a gate insulation film 20, then a semiconductor layer 30 on a gate electrode 10a branched from a gate wire 10. A drain electrode 14a branched from the drain wire 14 and a source electrode 15 are connected to the semiconductor layer 30.

The back panel 508 comprises a red filter, a blue filter and a green filter (simply referred to as color filters 507 in FIG. 6B) formed on a transparent panel 2 at respective positions corresponding to each three adjacent pixels on the active matrix panel. A light blocking film 512 is formed between the color filters in order to block light from leaking between the color filters or the thin-film transistors on the active matrix panel. A common electrode 16 composed of an ITO is formed on the color filter 507 and the light-blocking film 512.

Orientation films OR 11 (rubbed in the direction of the dashed arrow 604 in FIG. 7) and OR 12 (rubbed in the direction of the dashed arrow 603 in FIG. 7) composed of polyimide films are respectively formed on the inner surfaces of the two transparent panels such that their directions of orientation are roughly perpendicular. These orientation films OR 11 and OR 12 control the direction of orientation of the liquid crystal molecules such that they are approximately parallel to the transparent panels and twist over an angle of 78°–90° from one transparent panel to the other transparent panel. $\Delta_n$ upper polarizing plate and a lower polarizing plate are respectively provided on the outer surfaces of the transparent panels with their axes of polarization oriented so as to be rotated by 45° with respect to the direction of the scanning lines (gate wire 10) and mutually perpendicular.

The method for producing the liquid crystal display device according to the present invention shall be described below.

The active matrix panel was formed by sputtering a chrome film onto a transparent glass panel, and forming a pattern of gate wires 10 (with one branched gate electrode 10a formed for each pixel) by means of photolithography. A gate insulation film 20 composed of silicon nitride and an amorphous silicone (a-Si) film were sequentially formed thereon by means of a CVD process, and the a-Si film is patterned into a semiconductor layer 30. Next, drain wires 14 (having branched drain electrodes 14a) and source electrodes 15 composed of chrome were formed, pixel electrodes 17 composed of ITO were formed, and an insulation protection film 23 composed of silicon nitride was formed thereon. Next, a polyimide film was formed, then rubbed in a direction inclined by 45°–51°, for example 50°, with respect to the scanning direction of the gate wires so as to form an orientation film OR 11. The structure of each thin-film transistor was the same as that described for the background art.

Next, a light blocking film 512 was formed on the transparent panel 2, color filters 507 were formed, common electrodes 16 were formed, and a polyimide film was formed and rubbed to produce the orientation film OR 12, after which the active matrix panel 509 and the back panel 508 were stacked together such that there directions of orientation were twisted by 78°–90°, for example 80°, with respect to each other, with a spacer of approximately 3.5–4.0 μm therebetween. The periphery was then sealed by a resin to produce a liquid crystal display panel. This was filled with a nematic liquid crystal composition having a dielectric constant anisotropy $\Delta\epsilon$ of 6.9–10, a refractive index anisotropy $\Delta_n$ of 0.075–0.100, and a threshold voltage of 1.2 V or less, after which the injection hole was sealed. Polarizing plates 505 and 506 were then respectively adhered to the outsides of the panels to produce a TN mode, normally-white format active matrix type liquid crystal display device.

The above-mentioned liquid crystal layer can, for example, be obtained by appropriately mixing the compounds expressed by the following formulas (1), (2) and (3) (having a purity of resistivity $10^{13}$–$10^{14}$ Ω.cm), and adding a chiral dopant.

In the formulas, each of $x_1$, $x_2$ and $x_3$ represents any one of a fluoro group, a fluoromethyl group, a difluoromethyl group, a trifluoromethyl group, a fluoromethoxy group, a difluoromethoxy group, a trifluoromethoxy group or a hydrogen atom.

R represents an alkyl group or alkoxy group having 1 to 10 carbon atoms which may be substituted.

n represents an integer of either 1 or 2, and Y represents a methylene, an ethylene or a single bond.

While the present embodiment is a TN mode, normally-white format TFT active matrix type liquid crystal display device, the angle over which low perspective angle gradation inversion occurs was large, and the straight-on contrast and contrast peak were able to be contained in the range of practical application. Additionally, the occurrence of disclination and display blotches due to the absence of chiral dopants was able to be prevented.

Although the straight-on contrast will increase as the dielectric constant is increased, if the dielectric constant is too large, then the voltage retention rate during a non-selection period will be reduced, thereby resulting in differences in the brightness and causing flickers in the display. Additionally, if the dielectric constant is too large, the polarity of the liquid crystal molecules becomes high and they tend to attract ionic impurities. Therefore, if the same image is displayed over a long period of time, residual images will remain, thus resulting in display blotches.

Accordingly, the upper limit for $\Delta_\epsilon$ should be set at an appropriate value in view of the possibility of the occurrence of flickering, residual images and display blotches. While problems for practical application were able to be eliminated in the present embodiment, those wherein $\Delta_\epsilon$ was set at 11 were found to be impractical due to the occurrence of residual images and display blotches.

EXAMPLES

In a first example, the twist angle was set to 82°, $\Delta_n d$ to 0.35 μm (d=4.0 μm, $\Delta_\epsilon$=6.5), and the threshold voltage to 1.2 V. The liquid crystal layer was produced by mixing nine types of compounds expressed by formula (3) in the following proportions, and adding a chiral dopant.

TABLE 1

| R | n | Y | $X_1$ | $X_2$ | $X_3$ | wt % |
|---|---|---|---|---|---|---|
| —$C_3H_7$ | 1 | single bond | H | —$OCH_3$ | H | 14 |
| —$C_7H_{15}$ | 1 | single bond | H | F | H | 11 |
| —$C_2H_5$ | 2 | single bond | H | —$OCF_3$ | H | 15 |
| —$C_4H_9$ | 2 | single bond | H | —$OCF_3$ | H | 12 |

TABLE 1-continued

| R | n | Y | $X_1$ | $X_2$ | $X_3$ | wt % |
|---|---|---|---|---|---|---|
| —$C_3H_7$ | 2 | $C_2H_4$ | F | F | H | 10 |
| —$C_5H_{11}$ | 2 | $C_2H_4$ | F | F | H | 10 |
| —$C_2H_5$ | 2 | single bond | F | —$OCHF_2$ | F | 10 |
| —$C_3H_7$ | 2 | single bond | F | —$OCF_3$ | F | 10 |
| —$C_5H_{11}$ | 2 | single bond | F | —$OCF_3$ | F | 8 |

As a result, exceptional display characteristics were obtained wherein low perspective angle gradation inversion occurred at 27° and the straight-on contrast was 146.

In a normal active matrix type liquid crystal display device wherein the dielectric constant anisotropy $\Delta_\epsilon$ is 4, $\Delta_n d=0.45$, $d=4.0$ μm, the twist angle is 90°, the elastic modulus is approximately the same as the first example, and the threshold voltage is 1.8 V, the straight-on contrast is 135, but the angle at which low perspective angle gradation inversion occurs is 7°.

In a second example, a liquid crystal display device was produced in the same manner as in the first example with the exceptions that liquid crystal having a dielectric constant anisotropy $\Delta_\epsilon$ of 6.9, $\Delta_n d=0.30$, and almost no difference in the elastic modulus was used, with the voltage set at 1.2 V, the orientation arranged so that the twist angle was 78°, and using a 3.5 μm spacer (d=3.5 μm). The straight-on-contrast was 130 and low perspective angle gradation inversion occurred at 29°.

In a third example, a liquid crystal display device was produced in the same manner as in the first example with the exceptions that liquid crystal having a dielectric constant anisotropy $\Delta_\epsilon$ of 7.3, $\Delta_n d=0.36$, and almost no difference in the elastic modulus was used, with the voltage set at 1.1 V, the orientation arranged so that the twist angle was 84°, and using a 4.0 μm spacer (d=3.5 μm). The straight-on contrast was 190 and low perspective angle gradation inversion occurred at 27°.

Thus, by setting the twist angle and $\Delta_n d$ at appropriate values and using liquid crystal having dielectric constant anisotropy and threshold voltages in specific ranges, there is no reduction in the transmitted optical intensity or straight-on contrast, and the gradation inversion is improved greatly.

Disclination, display blotches and flickering occurred in none of the first through third examples.

While TN mode, normally-whit format active matrix type liquid crystal display devices using TFTs as switch elements have been described above, it should be evident to those skilled in the art without any detailed explanation that the present invention can also be applied to active matrix type liquid crystal display devices using two-terminal elements such as MIM (Metal Insulator Metal) as the switch elements.

I claim:

1. A TN mode, normally-white format liquid crystal display device, comprising:

a base panel having a plurality of switch elements and pixel electrodes connected thereto, arranged in matrix-form and covered by a first orientation film;

a back panel having a plurality of color filters corresponding to said pixel electrodes, and covered by a second orientation film;

a liquid crystal layer between said base panel and said back panel;

a first polarizing plate provided on an outside of said base panel; and a second polarizing plate provided on an outside of said back panel;

wherein a twist angle of the liquid crystal layer is at least 78° and at most 90°, a product $\Delta_n d$ between a refractive index anisotropy $\Delta_n$ and a thickness d of said liquid crystal layer is at least 0.3 μm and at most 0.4 μm, a dielectric constant anisotropy $\Delta_\epsilon$ of the liquid crystal layer is at least 6.2, and a threshold voltage of the liquid crystal display device is at most 1.2 V.

2. A liquid crystal display device in accordance with claim 1, wherein said first orientation film and said second orientation film comprise polyimide films which have been rubbed.

3. A liquid crystal display device in accordance with claim 1, wherein said base panel comprises a plurality of parallel scanning lines provided on the surface of a first transparent panel, a plurality of parallel signal lines intersecting the scanning lines, a plurality of three-terminal switch elements each provided at a portion of intersection between the scanning lines and the signal lines and connected to a scanning line and a signal line, and an insulation protection film provided between the signal lines and switch elements and said first orientation film; and said back panel comprises a plurality of light-blocking films and color filters provided on a surface of a second transparent panel at selected positions corresponding to the switch elements of said base panel, and a common electrode provided between the color filters and said second orientation film.

4. A TN mode, normally-white format liquid crystal display device, comprising:

a base panel having a plurality of switch elements and pixel electrodes connected thereto, arranged in matrix-form and covered by a first orientation film;

a back panel having a plurality of color filters corresponding to said pixel electrodes, and covered by a second orientation film;

a liquid crystal layer between said base panel and said back panel;

a first polarizing plate provided on an outside of said base panel; and a second polarizing plate provided on an outside of said back panel;

wherein a twist angle is at least 84° and at most 90°, a product $\Delta_n d$ between a refractive index anisotropy $\Delta_n$ and a thickness d of said liquid crystal layer is at least 0.35 μm and at most 0.38 μm, a dielectric constant anisotropy $\Delta_\epsilon$ is at least 6.2, and a threshold voltage is at most 1.2 V.

5. A liquid crystal display device in accordance with claim 4, wherein said first orientation film and said second orientation film comprise polyimide films which have been rubbed.

6. A liquid crystal display device in accordance with claim 4, wherein said base panel comprises a plurality of parallel scanning lines provided on the surface of a first transparent panel, a plurality of parallel signal lines intersecting the scanning lines, a plurality of three-terminal switch elements each provided at a portion of intersection between the scanning lines and the signal lines and connected to a scanning line and a signal line, and an insulation protection film provided between the signal lines and switch elements and said first orientation film; and said back panel comprises a plurality of light-blocking films and color filters provided on a surface of a second transparent panel at selected positions corresponding to the switch elements of said base panel, and a common electrode provided between the color filters and said second orientation film.

* * * * *

UNITED STATES PATENT AND TRADEMARK OFFICE
CERTIFICATE OF CORRECTION

PATENT NO. : 5,854,666
DATED : December 29,1998
INVENTOR(S) : Eriko Fujimaki

It is certified that error appears in the above-identified patent and that said Letters Patent is hereby corrected as shown below:

Col. 10, Line 43: after "angle" insert --of the liquid crystal layer--

Col. 10, Line 46: after "$\Delta_\epsilon$" insert --of the liquid crystal layer--

Col. 10, Line 47: after "voltage" insert --of the liquid crystal display device--

Signed and Sealed this

Third Day of August, 1999

Q. TODD DICKINSON

*Attest:*

*Attesting Officer*     Acting Commissioner of Patents and Trademarks